Dec. 12, 1950    W. C. HASSELHORN    2,534,124
METHOD OF FABRICATING BELLOWS
Filed March 22, 1945    2 Sheets-Sheet 2
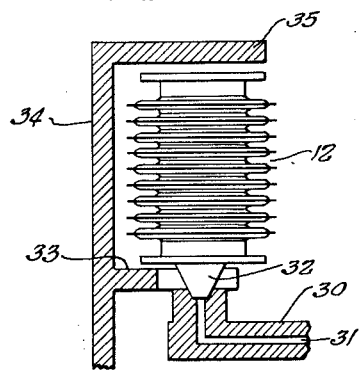
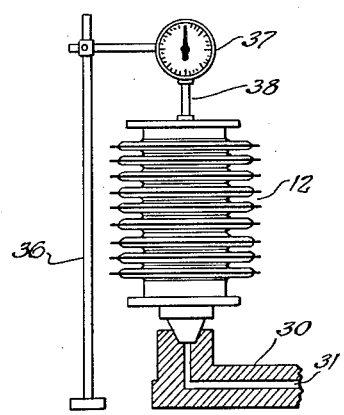
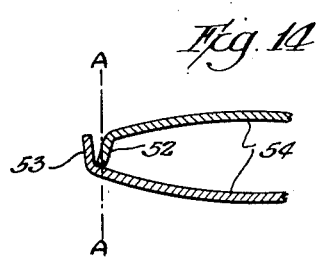
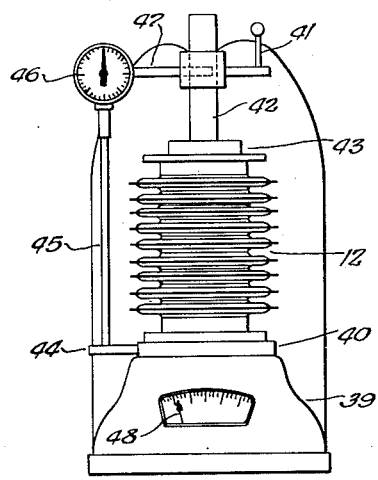
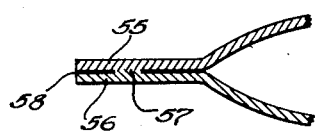
Inventor
Walter C. Hasselhorn
By Thiess, Olsen & Mecklenburger
Attys.

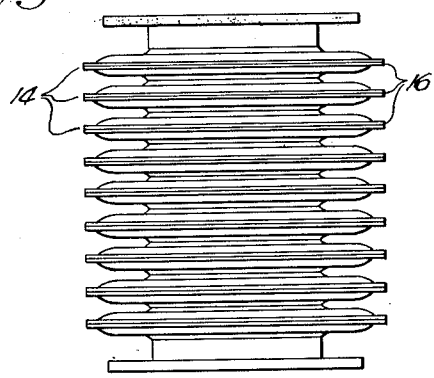
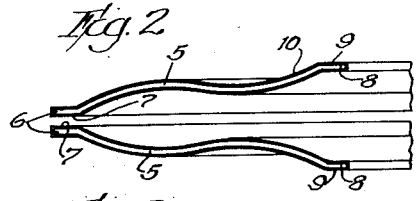
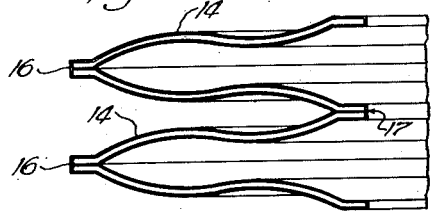
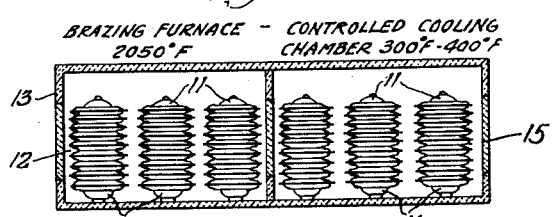
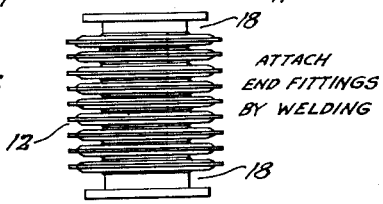
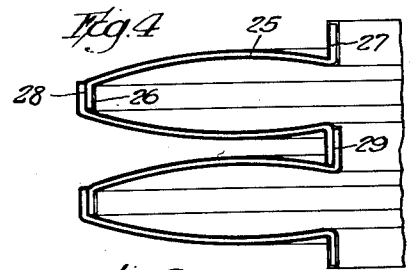
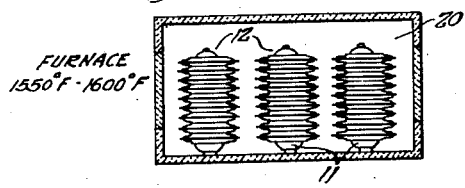
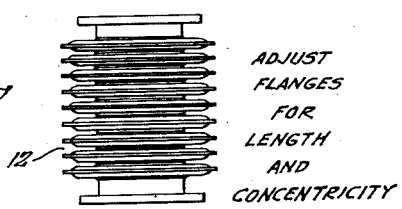
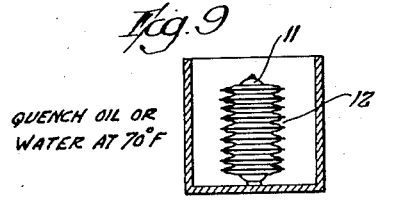
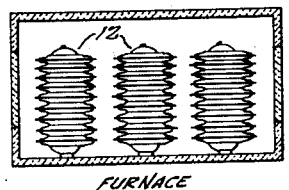

Patented Dec. 12, 1950

2,534,124

UNITED STATES PATENT OFFICE 2,534,124

METHOD OF FABRICATING BELLOWS

Walter C. Hasselhorn, Chicago, Ill., assignor to Cook Electric Company, Chicago, Ill., a corporation of Illinois Application March 22, 1945, Serial No. 584,048

1 Claim. (Cl. 148—11.5)

This invention relates to a new and improved metal bellows and to the method of making the same.

The improvement herein disclosed is broadly described and claimed in co-pending application, Serial No. 534,056, filed May 4, 1944. In said application, I have broadly disclosed a method of making metal bellows of a calibrated or controlled spring rate capable of responding uniformly to predetermined variations of pressure and to return to the same no-load position unimpaired. Among the steps included are spinning or drawing the diaphragms or plates of a soft or semi-soft spring metal and joining the peripheries by a relatively high thermal treatment, keeping the metal soft so that the height of the flanges and their concentricity may be adjusted, and then subjecting the unit to a temper drawing operation that admits of a definite control of the spring rate imparted to the metal walls, this spring rate being substantially uniform throughout these metal walls without injuring or in any way affecting the joints formed.

Although the present invention is directed in its broader aspects to the aforesaid method, it is intended to cover one of the specific methods disclosed, together with certain specific improvements in the fabrication of a copper brazed joint at the periphery and of a novel form of bellows, this application being a continuation in part of said application.

The invention in its more specific aspects is directed to an improved method of fabricating a bellows of a controlled spring rate, which includes certain new and novel steps of preparing the bellows diaphragms or sections prior to the actual thermal treatment effecting the brazing action. I propose to provide these diaphragms with a copper coating, either by electroplating, spraying or dipping, and to utilize this coating at the surfaces abutting each other at the peripheries as the brazing material to join the diaphragms together. This is particularly novel when related to fabricating a metal bellows because air bubbles and pits are difficult to eliminate in a brazed bellows joint and are not discovered until the joint breaks. This is particularly detrimental in a bellows structure. By applying pressure to the diaphragms in stacked relation, the copper plating flows by capillary action between the joint's surfaces and these surfaces are brought to bear against each other to leave a film of copper therebetween, which forms an exceptionally strong joint that is devoid of air bubbles and pits, the brazing material forming an intergranular action at the surfaces of the parts to provide a bond therebetween of a character integrally uniting the parts together. The specific method disclosed herein which may include a step for treating the bellows to impart a calibrated spring rate thereto, makes it possible therefore to produce a type of joint structure that particularly lends itself to bellows of a controlled spring rate without in any way impairing the fabrication of such bellows or the production thereof with certain known characteristics.

This application is a continuation in part of my copending application Serial No. 538,536, filed June 3, 1944, now abandoned, wherein the product is claimed, the method being claimed herein.

Other objects and advantages of the invention will be apparent from the following detailed description when taken in connection with the accompanying drawings.

In the drawings:

Figure 1 is a vertical section of a metal bellows embodying the invention disclosed herein and showing one type of improved joint and diaphragm that may be used;

Fig. 2 is a fragmentary sectional view of two diaphragms forming what is known as a flange of the bellows;

Fig. 2a is a similar view of a single bellows flange of modified construction;

Fig. 3 illustrates the diaphragms of the type shown in Fig. 2 placed together to form two bellows flanges, this view illustrating the outer and inner peripheral joints after the brazing operation is completed;

Fig. 4 is a view similar to Fig. 3, but illustrating a slightly modified form of diaphragm and joint;

Fig. 5 illustrates the step of thermal treatment for effecting the brazing operation by means of a furnace or the like and a cooling chamber;

Fig. 6 illustrates the step of attaching the end fittings by welding if these end fittings have not been attached during the brazing operation;

Fig. 7 illustrates the step of adjusting the flanges for length and concentricity;

Fig. 8 illustrates the first step of the thermal treatment for spring tempering;

Fig. 9 illustrates the step of quenching the bellows units in oil or water;

Fig. 10 illustrates the second step of thermal treatment for spring tempering;

Fig. 11 illustrates the manner of testing for squirm and leak of a completed fabricated unit;

Fig. 12 illustrates the method of testing for hysteresis;

Fig. 13 illustrates apparatus that may be used to test the spring rate imparted to the finished bellows unit in accordance with the method disclosed herein;

Fig. 14 illustrates the effect, before normalizing, of the heat of the brazing operation on certain types of diaphragm rims, particularly when formed by a spinning operation of the metal; and Fig. 15 illustrates holding another form of diaphragm rims in capillary engagement during the thermal treatment of brazing by spot welding the same together.

The various structures and their method of fabrication disclosed herein permit the use of spring metal that may be obtained in an annealed or soft state, or semi-soft state which may be drawn or spun to the desired diaphragm curvature which may quite obviously vary as shown in Figs. 3 and 4. These diaphragms may be given any advantageous form for the type of bellows to be produced and made of plate stock of a thickness necessary for the requirements of the job. As illustrated in Figs. 2 and 3, each diaphragm 5 has its outer peripheral rim 6 provided with a flat or planar face 7 and its inner peripheral rim 8 provided with a flat or planar face 9.

It will be understood at the outset that the invention relates to bellows of any number of diaphragms joined together at their peripheries, with or without fittings at one or both ends, or to units commonly called wafers and having only one or two diaphragms and a single end fitting.

These diaphragms 5 are then plated with a suitable brazing material and I mention copper which may be applied in a thin or film-like layer 10, either by electrolytic plating, spraying or dipping. This material may advantageously be applied very thinly. A thickness of one thousandths inch up to several thousandths inch is mentioned. The base metal of the diaphragm may be any suitable spring metal, such as steel or a metal having a higher melting point than copper.

Diaphragms 5 are then assembled in a clamping fixture 11 and held together under pressure of the clamping fixture. Thereupon the assembled units 12 with fixtures 11 are placed in a controlled hydrogen atmosphere furnace 13 and subjected to a fusing temperature of copper until completely heat saturated, which may be 20 minutes or so, depending upon the base metal of the diaphragms and the mass. Copper plating 10 will then fuse and the pressure being applied by the clamping fixture 11 will press tightly together the faces 7 of outer rims 6, the two component diaphragms forming the respective flanges of the bellows, these flanges being designated broadly as 14, while the faces 9 of inner rims 8 of the diaphragms of adjacent flanges 14 will be pressed tightly together. As shown in Fig. 2, copper film 10 will extend about the entire diaphragm 5 if the latter is completely immersed in the electrolytic bath or completely sprayed or dipped and will therefore cover the faces 6 and 9 as shown in Fig. 2. However, it will be obvious that only the outer and inner rims 6 and 8 need be coated, as shown in Fig. 2a, if it is so desired.

Furnace 13 may be heated to a temperature of approximately 2050° F. The pressure exerted between diaphragms 5 will cause their respective outer faces 7 and inner faces 9 to be pressed directly against each other, having only a very thin film of copper 10 therebetween. It will be less than a double thickness of the coating resulting from pressing together two opposed faces of cooperating rims, and even less than the thickness of a single coating if so desired, because, in a fused state, it will be forced to flow outwardly to the edges of the faces and will thereby cover the entire surface of these faces by a capillary action. It will therefore be impossible to trap air, and consequently, pits and air or gas bubbles will be eliminated. The faces will be practically in surface contact. Only a thin film of brazing material will separate them. An unusually strong and very effective joint is provided because I have found that the best brazing joint will be provided when the mass of the brazing material is at a minimum. A thin layer will produce a capillary action causing the entire surfaces of the faces 7 and 9 to be covered.

The next step involved placing the units 12 in a controlled hydrogen atmosphere cooling chamber 15 held at a lower temperature than furnace 13, say between 300° F. and 400° F. until the temperature of these units is reduced to this value whence they are removed and allowed to cool further to room temperature.

It will be understood that end fittings 18 may be attached before units 12 are placed in brazing furnace 13 by extending the clamping fixtures 11 to include them, and thus they may be brazed in the same operation. If this should not be desired, end fittings 18 may be later attached. As shown in Fig. 6, the step may be accomplished by welding, either by arc welding using material of a welding rod to effect the union or by atomic hydrogen welding wherein the base metal of the parts joined is used to form the joint.

In any event, the metal of the bellows will be soft due to the annealing of the metal taking place during the brazing operation. The flanges may therefore be adjusted as to their length so that the bellows unit can be furnished to customers at any length and the difficulty of not being able to select the number of flanges that will produce the exact dimension desired by the customer is overcome. It is only necessary to extend or compress the flanges to meet the desired dimension, and the operation further admits of a novel adjustment to secure concentricity of the flanges, both of which adjustments are then made after all structural fabrication has been completed so that there will be no further possible change in shape or dimension.

If the brazing operation has set up local stresses and it is desirable to have a relatively strain-free structure at the time of drawing to produce a predetermined spring rate throughout the entire bellows unit, a stress-relieving anneal may form the next step in the method. If the brazing treatment has been conducted to subject the entire unit evenly to the brazing temperature and unequal strains are not present, a stress-relief anneal may not be necessary. If the metal is non-austenitic, heating the unit to the high critical temperature and quenching will impart uniform stressing, which will be relieved in a subsequent thermal treatment effecting the desired spring temper.

As disclosed specifically in the drawings, the next step in the method of fabrication involves subjecting the units 12 to a thermal treatment in either an open or closed furnace 20 shown in Fig. 8 at a temperature in the range of 1550° F. to 1600° F., or thereabouts, until heat soaked, or for about one to two hours. The units are then quenched in oil or water at room temperature, as shown in Fig. 9, and then again subjected to a temper drawing operation by being inserted in a furnace heated to a range of 400° F. to 1200° F., as shown in Fig. 10, according to the hardness and tensile strength desired. The spring rate will increase with the hardness produced by the thermal treatment while the spring rate may be defined as the number of pounds required to compress the bellows one inch and to have the bellows return to its original non-load position when relieved of the force without loss of stroke.

I have found that following the Rockwell C scale, a variation of five degrees of temperature in heating will change the hardness one point. Certain metals such as heat treatable high carbon or alloy steels will have a tensile strength of two hundred thousand pounds when treated at 575° F., a tensile strength of one hundred eighty thousand pounds when treated at 700° F., and a tensile strength in the neighborhood of one hundred twenty-five thousand pounds when treated at 1075° F. These figures are illustrative examples only, because the kind of metal and its grain structure at the time of thermally treating it to produce spring temper must be taken into consideration.

The method may be practiced to produce extremely sensitive spring bellows capable of faithfully responding indefinitely to a very slight pressure change to actuate a control device and to retain such sensitiveness over a range of continued pressure change of slight magnitude without failure or loss of stroke. After an initial loss of say one ten thousandths inch due to hysteresis of the metal, it has been found that a bellows embodying the present invention may function indefinitely to produce a minute but predetermined stroke to actuate an operating control device. On the other hand, heavy duty bellows of metal of relatively heavy gauge may also be produced with a like uniform spring rate. The invention permits the fabrication of bellows of increased dimensions and lengths not heretofore permitted by prior art methods. Consequently, increased capacity in the work performed as well as uses involving appreciably higher temperatures and pressures are possible. Bellows fabricated by the method disclosed herein and involving the invention have been designed for use in temperatures as high as 1200° F., and have been subjected to pressures of more than 10,000 pounds per square inch.

Fig. 4 illustrates another type of diaphragm configuration and peripheral joint. These diaphragms designated 25 are likewise drawn or spun of soft or semi-soft metal and have outer rims 26 and inner rims 27 provided with faces 28 and 29, respectively. Faces 28 and 29 are preferably flat or planar and are adjusted to cooperate with similar face of rims of adjacent diaphragms. In like manner, diaphragms 25 may be either entirely copper coated as shown in Fig. 2 or may have outer and inner rims 26 and 27 only coated as shown in Fig. 2a. Diaphragms 25 are assembled and fabricated in the manner described above and heat treated to have a calibrated spring rate imparted thereto. It may be mentioned that in this form, as well as in the previous form of diaphragm structure, metal as thick as .125 inch may be used in the fabrication of bellows for heavy duty work and of a thickness as low as .0020 inch may be used for smaller and extremely sensitive units.

As a part of the method disclosed herein to produce bellows units by a form of fabrication and imparting a calibrated spring rate thereto, the steps for checking any error that might arise in the manufacture of the units are included. To this end, a finished bellows 12, as shown in Fig. 11, may be mounted upon apparatus 30 having a duct 31, by means of which fluid under pressure is supplied to the bellows unit through a nipple attachment 32. Bellows 12 may rest upon a lower arm 33 of a bracket 34 having an upper arm 35. When pressure is imparted to the interior of bellows 12, the upper end thereof will bear against arm 35, and the up-stroke will accordingly be restrained. If at a predetermined pressure any of the flanges 14 should be displaced, this is known as squirm and the bellows will be rejected. Also, if any leaks occur while bellows 12 is subjected to this pressure, the unit will be likewise rejected.

In Fig. 12, the same apparatus 30 may be used to supply pressure of predetermined increments to the interior of bellows 12. A standard 36 carrying a gauge 37 having movable pin 38 is adapted to be positioned adjacent apparatus 30 so that this movable pin will bear against the upper end of bellows 12 when it is in a position of rest and before any pressure is applied to the interior thereof. In testing the device for travel per increment of pressure, say in units of 50, 100 and 150 pounds per square inch, the reading of gauge 37 may be charted for the up-stroke and similar readings charted for the down-stroke when the pressure is lowered by the same increment value. After the metal takes a set or hysteresis occurs so that the return stroke is not equal to the up-stroke the down curve for the down stroke will not coincide with the curve for the up-stroke. If the hysteresis is not more than .00035 inch for a given reading and does not again occur on the second down-stroke at these different increments of pressure, an allowance is made therefor on the second set, the bellows unit can be accepted and used as a unit that will faithfully reproduce its movement in a sensitive manner and respond to slight variations in pressure.

As the final step, the apparatus illustrated in Fig. 13 may be used to determine the spring rate imparted to the finished bellows 12 after it has been fabricated by the method disclosed herein. The apparatus comprises a base 39, a weight table 40, a handle 41 adapted to be operatively connected to a shaft 42, and a head plate 43. Weight table 40 is provided with an extension 44 adapted to have a pin 45 bear thereagainst as shown, which pin is associated with a dial micrometer 46 carried by shaft 42. As shaft 42 rises and lowers, dial micrometer 46 also rises and lowers and brings pin 45 to bear against weight table extension 44. Scale dial 48 is designed to indicate the pressure in pounds that is applied against the upper end of bellows 12 when handle 41 is actuated. The degree of compression or travel of bellows 12 in terms of inches or any other suitable calibration will be indicated by dial micrometer 46. For example, the calibrated spring rate for bellows 12 will be 25 pounds per inch of travel if scale dial 48 indicates a pressure of 25 pounds being applied against the bellows when dial micrometer 46 indicates a travel of one inch of bellows 12.

From the foregoing explanation it will be apparent that with the checking of hysteresis and squirm and leak, a finished bellows unit may have a spring rate measuring so that any variations in the units of the same production lot will indicate failure of the operator properly to carry out the steps of the method herein disclosed for fabricating the same.

The method disclosed herein permits the fabrication of bellows units in practically any size, both as to inner and outer diameters and as to length. Not only may the feature be obtained but it may be obtained at nominal cost in the construction of the bellows. Sizes are possible that other processes could not produce. I mention seventy-two inches for the outer diameter as one of the sizes that has been built. The length is merely a matter of the number of flanges fabricated into a single unit. The joint is very strong and the seal is very effective. A large range of pressures may be utilized. At the present time, bellows thus far constructed in accordance with the invention have utilized from one pound pressure per square inch to an excess of ten thousand pounds per square inch. They have also been made for vacuum duty service for use with high vacuum equipment dealing with vacuum pressures of less than one hundredths of a micron.

A bellows unit embodying the above described invention overcomes many of the limitations of prior structures and may be characterized by (a) Extraordinary sizes and capacities;
(b) High temperature ranges in which they may be used;
(c) Increased tensile strength with elimination of creepage of metal under excessive loads and temperatures;
(d) Elimination of corrosion ordinarily produced by fluxes and brazing material;
(e) Ability to withstand pressures (10,000 pounds per square inch or more);
(f) Elimination of porosity in metal and joints;
(g) Increased traveling range and lateral deflection;
(h) Heavy duty service; and
(i) Practically no limit in flange dimension.

Although I have mentioned copper as the brazing material in carrying out the process disclosed herein, I have done so in connection with the temper drawing operation because it will provide a type of joint that will not be affected by the heat of the temper drawing operation. It permits, therefore, complete fabrication of the parts before tempering so that after the latter is completed no further work need necessarily be done on the bellows to change the controlled spring rate thus imparted. However, insofar as the use of what I term herein a capillary engagement between engaging surfaces of adjacent diaphragms and end fittings is concerned, it will be understood that the invention extends to use of other brazing materials having lower or higher melting points. In the case of lower melting points, a brazing temperature less than the lower critical limit of the base metal may be used so that spring tempered stock may be used to form the diaphragms and the temper thus preserved. Subsequent thermal treatment to spring temper will not be necessary.

One of the broader aspects of the invention is the use of this capillary engagement secured through holding the engaging surfaces of adjacent diaphragms and end fittings tightly together under pressure. This will produce an intergranular relation between the brazing material and the base metal of the diaphragms. The brazing material penetrates between the grain boundaries of the base metal and, therefore, a bond is formed between this brazing material and base metal that is homogeneous in character and integrally unites the parts together.

This capillary engagement can be affected in any way as by actual pressure between the parts or by a tight fit where a telescopic relation exists between the peripheries of the diaphragms as shown at 26 and 27 in Fig. 4. If the parts are of a thickness not to cause excessive or unequal stresses in the base metal of the peripheries when formed, these peripheries will maintain this tight fit during the brazing operation. It is part of the present invention, however, to include the step of normalizing the base metal before the brazing operation to relieve or equalize these stresses if the parts are formed in a manner to create such excessive or unequal strains. Fig. 14 illustrates the tendency of peripheral rims designated 52 and 53 of the telescoping type to open or separate as the result of the heat of the brazing operation when diaphragms 54 are formed in a manner to create these stresses. It will be observed that both rims 52 and 53 will tend to turn outwardly away from line of engagement designated A—A in Fig. 14. After the normalizing step, diaphragm rims 52 and 53, or the peripheries of the diaphragms irrespective of shape, are reformed as by spinning or stamping to bring them back to this original position or to assure that they will remain in their position of tight fit with each other. Where the engaging surfaces are provided by rims 55 and 56 of the kind shown in Fig. 15, the pressure between surfaces to secure a capillary relation may also be obtained by spot welding the rims as indicated at 57. The brazing material 58 may be in the form of a ring inserted between the engaging faces of rims 55 and 56, and even perforated at the points of welding if so desired. It will be remembered that the broad feature of capillary engagement between engaging faces of the diaphragms and end sections that produces the novel type of joint for bellows structures disclosed herein may be employed whether the brazing material is initially applied to such faces in the form of a film or is in the form of a separate ring adapted to be inserted between the engaging faces at the time of assembling the parts.

In this connection, it is not to be overlooked that the use of the brazing material as a film applied by electro-plating, dipping or spraying the parts is particularly novel in a bellows structure because it eliminates the difficulties of making a tight bond or joint due to formation of oxide or presence of dirt upon the base material at the time the parts are assembled for the brazing operation. Bellows structures are often used where reliability of operation is most essential and failure of operation of the control on the structure using the bellows may mean a substantial loss of property and life. The limitations placed upon the use of bellows structures as heretofore constructed have been the result of failures due to imperfect joints which are not known to exist until a breakdown occurs. By the various methods disclosed herein, a positive bond of a homogeneous character is produced. The brazing material may form an intergranular relation with the base material and due to the capillary flow the brazing material forms a continuous bond crosswise of the joint that is devoid of air bubbles, pits or other flaws.

Another advantage of the brazing material when applied in film form is that it may be used as a protective coating for a part of or all of the base material to prevent corrosion and also to permit the adoption of various metals that lend themselves to the construction of bellows but which could not be used heretofore on account of their tendency to corrode quickly or react when brought into contact with certain working materials during operation. An example of this situation is ferrous steel. There are also other metals. However, when coated with a copper film, for example, and then subjected to the temperature of a brazing operation, a finish results that gives a satin appearance which is not only advantageous from this standpoint because it eliminates a further finishing treatment after the brazing operation, but forms a protective coating in the nature of a ferrous copper alloy as the result of an amalgamating action of the copper film with the base metal. This coating formed in the same operation as brazing has extended not only the life of the fabricated unit but also extended its use to new fields and has given various industries a product not heretofore obtainable for solving certain of their problems. It will be recognized that brazing materials other than copper will also perform this result.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claim.

I claim:

The method of fabricating a sectional bellows unit of a desired height and diameter which comprises forming the wall of said bellows by constructing a plurality of individually formed diaphragms with cooperating surfaces at the peripheries, forming a film of metal on said diaphragms to cover said cooperating surfaces, assembling the diaphragms whereby the cooperating surfaces of adjacent diaphragms are brought into contact with each other, subjecting the diaphragms to a thermal treatment fusing the film of metal covering said cooperating surfaces to effect a union sealing the peripheries of adjacent diaphragms at said cooperating surfaces, maintaining the metal of said diaphragms in a relatively soft state after said thermal treatment, adjusting the concentricity of the united diaphragms and the spacing thereof with respect to each other while the metal is soft to provide the height to be desired in the finished product, and thereafter subjecting the diaphragms as adjusted to a spring tempering treatment to impart a relatively uniform spring rate to said metal.

WALTER C. HASSELHORN.

REFERENCES CITED

The following references are of record in the file of this patent:

UNITED STATES PATENTS

| Number | Name | Date |
|---|---|---|
| 1,236,523 | Williams | Aug. 14, 1917 |
| 1,427,404 | Mauck | Aug. 29, 1922 |
| 1,655,273 | Kelley | Jan. 3, 1928 |
| 1,717,196 | Emmet | June 11, 1929 |
| 1,830,780 | Brennan et al. | Nov. 10, 1931 |
| 1,836,634 | Urfer | Dec. 15, 1931 |
| 2,071,583 | Schutt | Feb. 23, 1937 |
| 2,117,106 | Silliman | May 10, 1938 |
| 2,154,273 | Kollsman | Apr. 11, 1939 |
| 2,199,423 | Taylor | May 7, 1940 |
| 2,232,176 | Guthric | Feb. 18, 1941 |
| 2,243,522 | Conklin | May 27, 1941 |
| 2,296,435 | Giard | Sept. 22, 1942 |
| 2,323,985 | Fausek et al. | July 13, 1943 |
| 2,402,204 | Phelan | June 18, 1946 |

OTHER REFERENCES

Metals Handbook, 1939 Edition, pages 1212 and 1215, published by American Society for Metals, Cleveland, Ohio.